United States Patent
Zhang

(10) Patent No.: US 10,691,665 B1
(45) Date of Patent: Jun. 23, 2020

(54) CONSTRUCTING BLOCKCHAIN WORLD STATE MERKLE PATRICIA TRIE SUBTREE

(71) Applicant: Alibaba Group Holding Limited, George Town (KY)

(72) Inventor: Wenbin Zhang, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/587,236

(22) Filed: Sep. 30, 2019

Related U.S. Application Data

(63) Continuation of application No. PCT/CN2019/076814, filed on Mar. 4, 2019.

(51) Int. Cl.
*G06F 16/23* (2019.01)
*H04L 9/06* (2006.01)

(52) U.S. Cl.
CPC ........ *G06F 16/2315* (2019.01); *H04L 9/0637* (2013.01); *H04L 2209/38* (2013.01)

(58) Field of Classification Search
CPC .................................................. G06F 16/2315
See application file for complete search history.

(56) References Cited

U.S. PATENT DOCUMENTS

| | | | |
|---|---|---|---|
| 2018/0097779 A1 | 4/2018 | Karame et al. | |
| 2018/0115428 A1 | 4/2018 | Lysenko et al. | |
| 2019/0358515 A1* | 11/2019 | Tran | A63B 21/0724 |

FOREIGN PATENT DOCUMENTS

| | | |
|---|---|---|
| CN | 106657187 | 5/2017 |
| CN | 108711052 | 10/2018 |
| CN | 108805565 | 11/2018 |
| WO | WO 2017148527 | 9/2017 |

OTHER PUBLICATIONS

Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
PCT International Search Report and Written Opinion in International Application No. PCT/CN2019/076814, dated Dec. 2, 2019, 6 pages.

(Continued)

*Primary Examiner* — Van H Oberly
(74) *Attorney, Agent, or Firm* — Fish & Richardson P.C.

(57) ABSTRACT

Implementations of this specification include traversing a world-state MPT in multiple iterations, and, at each iteration, for a current node of the world-state MPT, executing one of: marking the current node as an account node and storing an address of the current node in the address list, determining that the current node is an extension node, and moving to a next iteration of the traversal setting the current node to a node referenced by the extension node, and marking the current node as a transition node, and storing an address of the current node in the address list; creating a sub-tree of the world-state MPT based on the address list, a root node of the sub-tree including a root node of the world-state MPT, and one or more child nodes of the sub-tree corresponding to nodes of the world-state MPT having an address stored in the address list.

21 Claims, 11 Drawing Sheets

(56) References Cited

OTHER PUBLICATIONS

Extended European Search Report in European Application No. 19725904.7, dated Feb. 27, 2020, 11 pages.

Jakobsson et al., "Fractal Merkle Tree Representation and Traversal," International Conference on Financial Cryptography and Data Security, Jan. 2003, 2612:314-326.

Kim, medium.com [online], "Modified Merkle Patricia Trie-How Ethereum saves a state," Jun. 2018, retrieved on Feb. 27, 2020, retrieved from URL<https://medium.com/codechain/modified-merkle-patricia-trie-how-ethereum-saves-a-state-e6d7555078dd>, 6 pages.

Zhang et al., "A Method to Predict the Performance and Storage of Executing Contract for Ethereum Consortium-Blockchain," International Conference on Financial Cryptography and Data Security, Jun. 2018, pp. 63-74.

\* cited by examiner

US 10,691,665 B1

CONSTRUCTING BLOCKCHAIN WORLD STATE MERKLE PATRICIA TRIE SUBTREE

CROSS-REFERENCE TO RELATED APPLICATIONS

This application is a continuation of PCT Application No. PCT/CN2019/076814, filed on Mar. 4, 2019, which is hereby incorporated by reference in its entirety.

BACKGROUND

Distributed ledger systems (DLSs), which can also be referred to as consensus networks, and/or blockchain networks, enable participating entities to securely, and immutably store data. DLSs are commonly referred to as blockchain networks without referencing any particular use case. Example types of blockchain networks can include public blockchain networks, private blockchain networks, and consortium blockchain networks. A public blockchain network is open for all entities to use the DLS, and participate in the consensus process. A private blockchain network is provided for particular entity, which centrally controls read and write permissions. A consortium blockchain network is provided for a select group of entities, which control the consensus process, and includes an access control layer.

Hash trees can be used to blockchain networks to store information. For example, the world-state of a blockchain network (e.g., the state of nodes (accounts) in the blockchain network) can be stored in a hash tree. An example of a hash tree includes a world-state Merkle Patricia Trie (MPT), which maintains the world-state of all nodes (accounts) within the blockchain network. As blockchain networks grow, the world-state information correspondingly grows resulting in a complex, data-intensive hash tree.

Not all nodes within the blockchain network need maintain the world-state of the blockchain. For example, so-called consensus nodes (full clients), which participate in adding transactions to a blockchain within the blockchain network, maintain world-state hash trees to enable participation in the consensus process. Other nodes (light clients) that only conduct transactions within the blockchain network need not maintain, or even need to be aware of the world-state. Such nodes, however, should be aware of their own state, and the state of other nodes they transact with within the blockchain (e.g., partial-state). Given the size, and complexity of world-state hash trees, and resource limitations of devices used by light clients, a resource-, and bandwidth-efficient data structure, and process for updating the data structure for maintaining a partial-state of the blockchain network is needed.

SUMMARY

Implementations of this specification include computer-implemented methods for generating sub-trees of world-state Merkle Patricia Tries (MPTs), and updating the sub-trees.

In some implementations, actions include providing, by a consensus client of the blockchain network, a world-state MPT, and an address list for storing addresses of nodes within the blockchain network, the address list being initially empty, executing, by the consensus client, a traversal of at least a portion of the world-state MPT in multiple iterations, and, at each iteration, for a current node of the at least a portion of the world-state MPT, executing one of: marking the current node as an account node, and storing an address of the current node in the address list, determining that the current node is an extension node, and moving to a next iteration of the traversal setting the current node to a node referenced by the extension node, and marking the current node as a transition node, and storing an address of the current node in the address list; creating, by the consensus client, a sub-tree of the world-state MPT based on the address list, a root node of the sub-tree including a root node of the world-state MPT, and one or more child nodes of the sub-tree corresponding to nodes of the world-state MPT having an address stored in the address list, and transmitting, by the consensus client, the sub-tree of the world-state MPT to a non-consensus client of the blockchain network, the sub-tree providing a state of accounts associated with the non-consensus client. Other implementations include corresponding systems, apparatus, and computer programs, configured to perform the actions of the methods, encoded on computer storage devices.

These and other implementations may each optionally include one or more of the following features: the current node is marked as an account node in response to determining that the current node is one of a leaf node, and a branch node that is absent a null value; the current node is marked as a transition node in response to determining that the current node is a branch node, and that all children nodes of the branch node have been traversed; after marking the current node as an account node, the current node of a next iteration of the traversal includes a parent node of the account node; after marking the current node as one of an account node and a transition node, the current node of a next iteration of the traversal includes a child node of the one of the account node and the transition node; creating a sub-tree of the world-state MPT based on the address list at least partially includes, for an address marked as an account node in the address list, determining a path within the world-state MPT, and adding the path to the sub-tree; and the traversal includes a depth-first pre-order traversal.

This specification also provides one or more non-transitory computer-readable storage media coupled to one or more processors and having instructions stored thereon which, when executed by the one or more processors, cause the one or more processors to perform operations in accordance with implementations of the methods provided herein.

This specification further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with this specification may include any combination of the aspects and features described herein. That is, methods in accordance with this specification are not limited to the combinations of aspects and features specifically described herein, but also include any combination of the aspects and features provided.

The details of one or more implementations of this specification are set forth in the accompanying drawings and the description below. Other features and advantages of this specification will be apparent from the description and drawings, and from the claims.

DESCRIPTION OF DRAWINGS

Like reference symbols in the various drawings indicate like elements.

DETAILED DESCRIPTION

Figure 1:
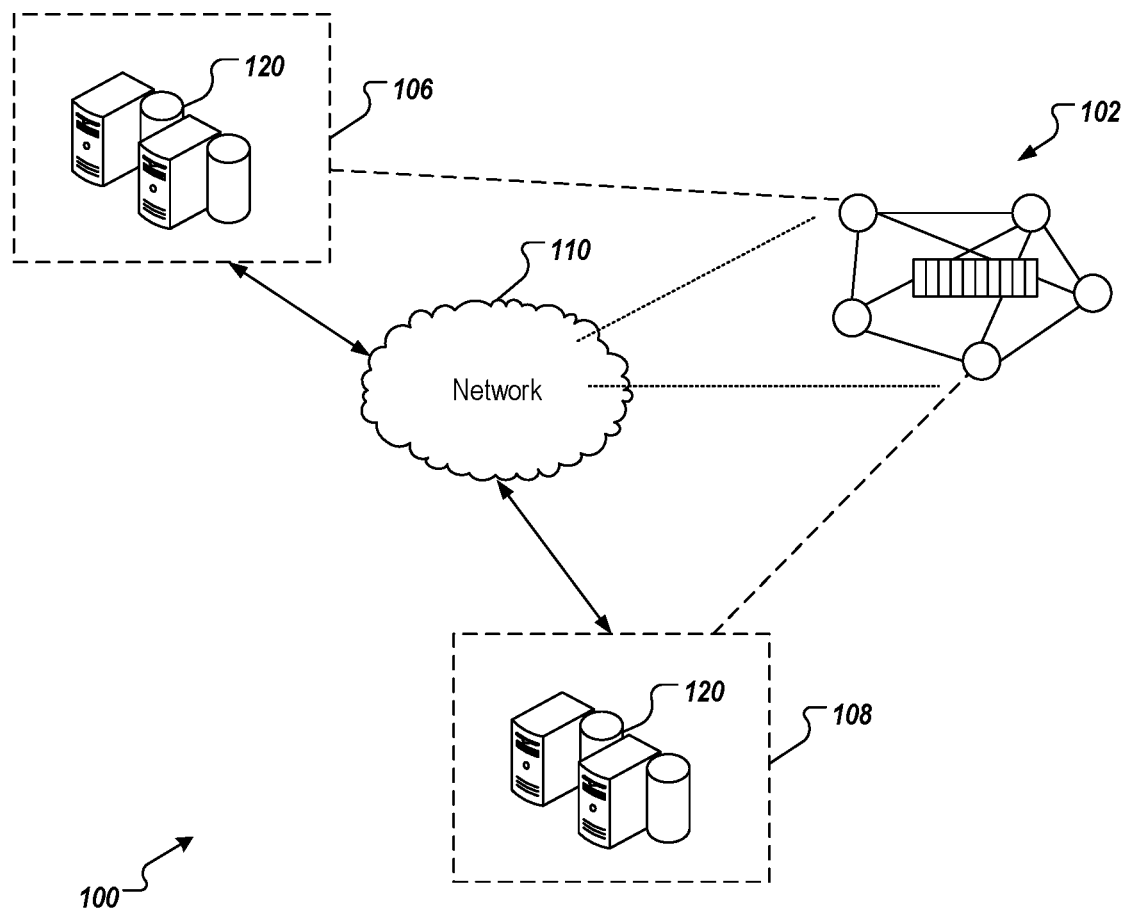
FIG. 1 depicts an example of an environment that can be used to execute implementations of this specification.

Implementations of this specification include computer-implemented methods for generating sub-trees of world-state Merkle Patricia Tries (MPTs), and updating the sub-trees. As describe in further detail herein, implementations of this specification include actions of traversing a world-state MPT in multiple iterations, and, at each iteration, for a current node of the world-state MPT, executing one of: marking the current node as an account node and storing an address of the current node in the address list, determining that the current node is an extension node, and moving to a next iteration of the traversal setting the current node to a node referenced by the extension node, and marking the current node as a transition node, and storing an address of the current node in the address list; creating a sub-tree of the world-state MPT based on the address list, a root node of the sub-tree including a root node of the world-state MPT, and one or more child nodes of the sub-tree corresponding to nodes of the world-state MPT having an address stored in the address list.

To provide further context for implementations of this specification, and as introduced above, distributed ledger systems (DLSs), which can also be referred to as consensus networks (e.g., made up of peer-to-peer nodes), and block-chain networks, enable participating entities to securely, and immutably conduct transactions, and store data. Although the term blockchain is generally associated with particular networks, and/or use cases, blockchain is used herein to generally refer to a DLS without reference to any particular use case.

A blockchain is a data structure that stores transactions in a way that the transactions are immutable. Thus, transactions recorded on a blockchain are reliable and trustworthy. A blockchain includes one or more blocks. Each block in the chain is linked to a previous block immediately before it in the chain by including a cryptographic hash of the previous block. Each block also includes a timestamp, its own cryptographic hash, and one or more transactions. The transactions, which have already been verified by the nodes of the blockchain network, are hashed and encoded into a Merkle tree. A Merkle tree is a data structure in which data at the leaf nodes of the tree is hashed, and all hashes in each branch of the tree are concatenated at the root of the branch. This process continues up the tree to the root of the entire tree, which stores a hash that is representative of all data in the tree. A hash purporting to be of a transaction stored in the tree can be quickly verified by determining whether it is consistent with the structure of the tree. Whereas a blockchain is a decentralized or at least partially decentralized data structure for storing transactions, a blockchain network is a network of computing nodes that manage, update, and maintain one or more blockchains by broadcasting, verifying and validating transactions, etc.

As introduced above, a blockchain network can be provided as a public blockchain network, a private blockchain network, or a consortium blockchain network. Implementations of this specification are described in further detail herein with reference to a consortium blockchain network. It is contemplated, however, that implementations of this specification can be realized in any appropriate type of blockchain network. Although techniques described in this specification are indicated as being relevant to consortium blockchain networks, the techniques can also be used, with or without changes, in other types of blockchain networks, including public blockchain networks and private blockchain networks.

In general, a consortium blockchain network is private among the participating entities. In a consortium blockchain network, the consensus process is controlled by an authorized set of nodes, which can be referred to as consensus nodes, one or more consensus nodes being operated by a respective entity (e.g., a financial institution, insurance company). For example, a consortium of ten (10) entities (e.g., financial institutions, insurance companies) can operate a consortium blockchain network, each of which operates at least one node in the consortium blockchain network.

In some examples, within a consortium blockchain network, a global blockchain is provided as a blockchain that is replicated across all nodes. That is, all consensus nodes are in perfect state consensus with respect to the global blockchain. To achieve consensus (e.g., agreement to the addition of a block to a blockchain), a consensus protocol is implemented within the consortium blockchain network. Example consensus protocols include, without limitation, practical Byzantine fault tolerance (PBFT), proof-of-work (POW), proof-of-stake (POS), and proof-of-authority (POA).

Implementations of this specification are described in further detail herein in view of the above context. More particularly, and as described in further detail herein, implementations of this specification execute a depth-first pre-order traversal to improve the order of search addresses in the MPT tree, and utilize a special type of node in the traversal process, referred to herein as a transition node, between two account nodes (leaf nodes).

In further detail, implementations of this specification provide a world-state sub-tree, referred to herein as sub-tree T2 based on a world-state MPT T0, and an address list L0. Implementations of this specification avoid finding the path from the root node to a lead node for each address by first constructing a sub-tree from the address list L0, referred to herein as sub-tree T1, then executing the depth-first pre-order traversal in the sub-tree T1. The account node address, and a transition node address are found in turn through the depth-first pre-order traversal. If there is a transition node between two account nodes, the first account node is returned to the transition node, and the other account node is found from the transition node. In this manner, the search for the second account node need not begin at the root node, and instead begins at the transition node.

As also described in further detail herein, implementations of this specification reduce processor, and storage requirements. For example, for each address, the path from the root node to its corresponding leaf node is saved, and the overlapping nodes in these paths are merged. More particularly, instead of storing a complete paths from the root node to each account node (i.e., each leaf node corresponding to an account address), only the path from the transition node to the next account node is saved, if there is a transition node between the two account nodes. In this manner, paths to the multiple account nodes are merged, which improves efficiency and avoids the operational and storage waste caused by overlapping paths.

FIG. 1 depicts an example of an environment 100 that can be used to execute implementations of this specification. In some examples, the example environment 100 enables entities to participate in a consortium blockchain network 102. The example environment 100 includes computing devices 106, 108, and a network 110. In some examples, the network 110 includes a local area network (LAN), wide area network (WAN), the Internet, or a combination thereof, and connects web sites, user devices (e.g., computing devices), and back-end systems. In some examples, the network 110 can be accessed over a wired and/or a wireless communications link. In some examples, the network 110 enables communication with, and within the consortium blockchain network 102. In general the network 110 represents one or more communication networks. In some cases, the computing devices 106, 108 can be nodes of a cloud computing system (not shown), or can each computing device 106, 108 be a separate cloud computing system including a plurality of computers interconnected by a network and functioning as a distributed processing system.

In the depicted example, the computing systems 106, 108 can each include any appropriate computing system that enables participation as a node in the consortium blockchain network 102. Examples of computing devices include, without limitation, a server, a desktop computer, a laptop computer, a tablet computing device, and a smartphone. In some examples, the computing systems 106, 108 hosts one or more computer-implemented services for interacting with the consortium blockchain network 102. For example, the computing system 106 can host computer-implemented services of a first entity (e.g., Participant A), such as transaction management system that the first entity uses to manage its transactions with one or more other entities (e.g., other participants). The computing system 108 can host computer-implemented services of a second entity (e.g., Participant B), such as transaction management system that the second entity uses to manage its transactions with one or more other entities (e.g., other participants). In the example of FIG. 1, the consortium blockchain network 102 is represented as a peer-to-peer network of nodes, and the computing systems 106, 108 provide nodes of the first entity, and second entity respectively, which participate in the consortium blockchain network 102.

Figure 2:
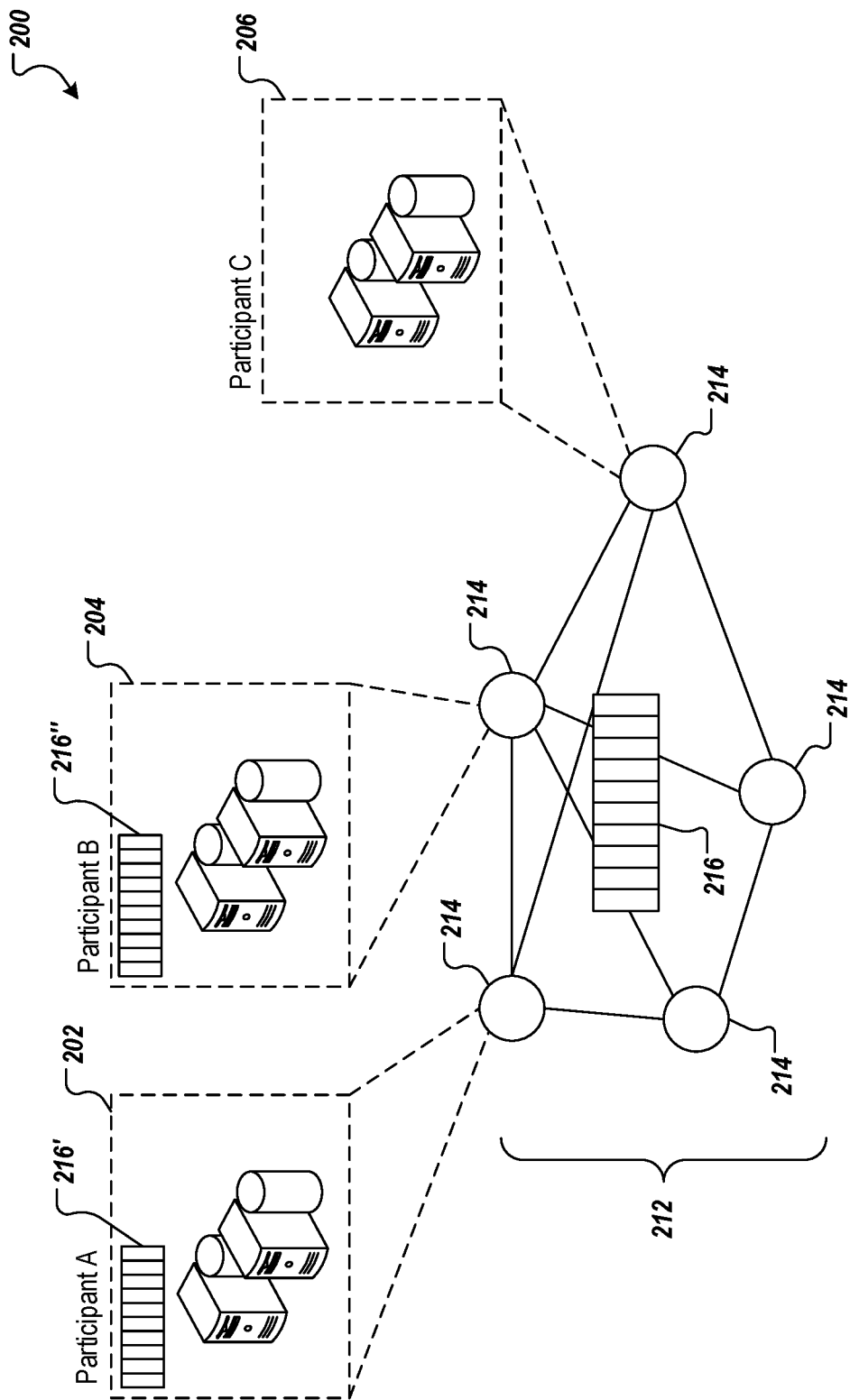
FIG. 2 depicts an example of a conceptual architecture in accordance with implementations of this specification.

FIG. 2 depicts an example of a conceptual architecture 200 in accordance with implementations of this specification. The example conceptual architecture 200 includes participant systems 202, 204, 206 that correspond to Participant A, Participant B, and Participant C, respectively. Each participant (e.g., user, enterprise) participates in a blockchain network 212 provided as a peer-to-peer network including a plurality of nodes 214, at least some of which immutably record information in a blockchain 216. Although a single blockchain 216 is schematically depicted within the blockchain network 212, multiple copies of the blockchain 216 are provided, and are maintained across the blockchain network 212, as described in further detail herein.

In the depicted example, each participant system 202, 204, 206 is provided by, or on behalf of Participant A, Participant B, and Participant C, respectively, and functions as a respective node 214 within the blockchain network. As used herein, a node generally refers to an individual system (e.g., computer, server) that is connected to the blockchain network 212, and enables a respective participant to participate in the blockchain network. In the example of FIG. 2, a participant corresponds to each node 214. It is contemplated, however, that a participant can operate multiple nodes 214 within the blockchain network 212, and/or multiple participants can share a node 214. In some examples, the participant systems 202, 204, 206 communicate with, or through the blockchain network 212 using a protocol (e.g., hypertext transfer protocol secure (HTTPS)), and/or using remote procedure calls (RPCs).

Nodes 214 can have varying degrees of participation within the blockchain network 212. For example, some nodes 214 can participate in the consensus process (e.g., as minder nodes that add blocks to the blockchain 216), while other nodes 214 do not participate in the consensus process. As another example, some nodes 214 store a complete copy of the blockchain 216, while other nodes 214 only store copies of portions of the blockchain 216. For example, data access privileges can limit the blockchain data that a respective participant stores within its respective system. In the example of FIG. 2, the participant systems 202, 204 store respective, complete copies 216', 216" of the blockchain 216.

Nodes participating in a blockchain network can be referred to as clients, which connects with other clients in a peer-to-peer manner. As noted above, clients (nodes) can participate in a blockchain network to varying degrees. For example, clients can include full clients, and light clients.

In some examples, a full client participates in the consensus processing, and maintains the state of the blockchain (e.g., stores, and continuously updates the blockchain). Consequently, each full client downloads and verifies every block that is added to the blockchain, and, thus, every transaction in each block. In the example of FIG. 2, the participant systems 202, 204 can be considered full clients (full nodes).

In some examples, a light client (light node) enables users to access and interact with the blockchain system. Light clients do not participate in the consensus processing, and do not sync the complete blockchain. Consequently, a light client can be referred to as a non-consensus node. Instead, the light client connects to one or more full clients, through which the light client interacts with the blockchain. That is, the light client does not directly interact with the blockchain, instead, using full nodes as intermediaries. Accordingly, light clients require significantly less computing resources and storage than full clients (e.g., orders of magnitude less). Light clients, however, may not have access to the entirety of the blockchain, and instead, may only be able to view, or access data that they are authorized to access. In the example of FIG. 2, the participant systems 206 can be considered a light client without a copy of the blockchain 216.

A blockchain (e.g., the blockchain 216 of FIG. 2) is made up of a chain of blocks, each block storing data. An example of data includes transaction data representative of a transaction between two or more participants. While transactions are used herein by way of non-limiting example, it is contemplated that any appropriate data can be stored in a blockchain (e.g., documents, images, videos, audio). Examples of transactions can include, without limitation, exchanges of something of value (e.g., assets, products, services, currency). The transaction data is immutably stored within the blockchain. That is, the transaction data cannot be changed.

Before storing in a block, the transaction data is hashed. Hashing is a process of transforming the transaction data (provided as string data) into a fixed-length hash value (also provided as string data). It is not possible to un-hash the hash value to obtain the transaction data. Hashing ensures that even a slight change in the transaction data results in a completely different hash value. Further, and as noted above, the hash value is of fixed length. That is, no matter the size of the transaction data the length of the hash value is fixed. Hashing includes processing the transaction data through a hash function to generate the hash value. An example hash function includes, without limitation, the secure hash algorithm (SHA)-256, which outputs 256-bit hash values.

Transaction data of multiple transactions are hashed and stored in a block. For example, hash values of two transactions are provided, and are themselves hashed to provide another hash. This process is repeated until, for all transactions to be stored in a block, a single hash value is provided. This hash value is referred to as a Merkle root hash, and is stored in a header of the block. A change in any of the transactions will result in change in its hash value, and ultimately, a change in the Merkle root hash.

Blocks are added to the blockchain through a consensus protocol. Multiple nodes within the blockchain network participate in the consensus protocol, and perform work to have a block added to the blockchain. Such nodes are referred to as consensus nodes. PBFT, introduced above, is used as a non-limiting example of a consensus protocol. The consensus nodes execute the consensus protocol to add transactions to the blockchain.

In further detail, the consensus node generates a block header, hashes all of the transactions in the block, and combines the hash value in pairs to generate further hash values until a single hash value is provided for all transactions in the block (the Merkle root hash). This hash is added to the block header. The consensus node also determines the hash value of the most recent block in the blockchain (i.e., the last block added to the blockchain). The consensus node also adds a nonce value, and a timestamp to the block header.

In general, PBFT provides a practical Byzantine state machine replication that tolerates Byzantine faults (e.g., malfunctioning nodes, malicious nodes). This is achieved in PBFT by assuming that faults will occur (e.g., assuming the existence of independent node failures, and/or manipulated messages sent by consensus nodes). In PBFT, the consensus nodes are provided in a sequence that includes a primary consensus node, and backup consensus nodes. The primary consensus node is periodically changed, Transactions are added to the blockchain by all consensus nodes within the blockchain network reaching an agreement as to the world state of the blockchain network. In this process, messages are transmitted between consensus nodes, and each consensus nodes proves that a message is received from a specified peer node, and verifies that the message was not modified during transmission.

In PBFT, the consensus protocol is provided in multiple phases with all consensus nodes beginning in the same state. To begin, a client sends a request to the primary consensus node to invoke a service operation (e.g., execute a transaction within the blockchain network). In response to receiving the request, the primary consensus node multicasts the request to the backup consensus nodes. The backup consensus nodes execute the request, and each sends a reply to the client. The client waits until a threshold number of replies are received. In some examples, the client waits for f+1 replies to be received, where f is the maximum number of faulty consensus nodes that can be tolerated within the blockchain network. The final result is that a sufficient number of consensus nodes come to an agreement on the order of the record that is to be added to the blockchain, and the record is either accepted, or rejected.

In some blockchain networks, cryptography is implemented to maintain privacy of transactions. For example, if two nodes want to keep a transaction private, such that other nodes in the blockchain network cannot discern details of the transaction, the nodes can encrypt the transaction data. Example cryptography includes, without limitation, symmetric encryption, and asymmetric encryption. Symmetric encryption refers to an encryption process that uses a single key for both encryption (generating ciphertext from plaintext), and decryption (generating plaintext from ciphertext). In symmetric encryption, the same key is available to multiple nodes, so each node can en-/de-crypt transaction data.

Asymmetric encryption uses keys pairs that each include a private key, and a public key, the private key being known only to a respective node, and the public key being known to any or all other nodes in the blockchain network. A node can use the public key of another node to encrypt data, and the encrypted data can be decrypted using other node's private key. For example, and referring again to FIG. 2, Participant A can use Participant B's public key to encrypt data, and send the encrypted data to Participant B. Participant B can use its private key to decrypt the encrypted data (ciphertext) and extract the original data (plaintext). Messages encrypted with a node's public key can only be decrypted using the node's private key.

Asymmetric encryption is used to provide digital signatures, which enables participants in a transaction to confirm other participants in the transaction, as well as the validity of the transaction. For example, a node can digitally sign a message, and another node can confirm that the message was sent by the node based on the digital signature of Participant A. Digital signatures can also be used to ensure that messages are not tampered with in transit. For example, and again referencing FIG. 2, Participant A is to send a message to Participant B. Participant A generates a hash of the message, and then, using its private key, encrypts the hash to provide a digital signature as the encrypted hash. Participant A appends the digital signature to the message, and sends the message with digital signature to Participant B. Participant B decrypts the digital signature using the public key of Participant A, and extracts the hash. Participant B hashes the message and compares the hashes. If the hashes are same, Participant B can confirm that the message was indeed from Participant A, and was not tampered with.

To provide further context for implementations of this specification, a hash tree (also referred to as a Merkle tree, introduced above) is a tree of nodes, and edges between nodes. A Merkle tree includes a root node, children nodes, and leaf nodes. In a blockchain network, the Merkle tree stores hash values, described above. In the Merkle tree, each leaf node is labelled with the hash of a data block, and every non-leaf node is labelled with the hash of the labels of its child nodes. Merkle trees enable efficient and secure verification of the contents of large data structures, such as blockchains. A trie (also referred to as a prefix tree) is a multi-way tree structure that can be used to store strings over an alphabet. A Patricia trie is a compact representation of a trie, in which any node that is an only child is merged with its parent node. A Merkle Patricia trie (also referred to as a Merkle Patricia trie (tree), or MPT) is a tree that incorporates both a Merkle tree and a Patricia trie (prefix tree), inheriting the advantages of both. A MPT provides for quick comparison, and updating of data.

In further detail, a MPT can be described as a persistent, mutable data structure that maps between 256-bit binary fragments and arbitrary-length binary data (byte arrays). In some examples, a MPT can be implemented as a database. The MPT provides a single value that identifies a given set of key-value pairs, which may be either a 32-byte sequence, or an empty byte sequence. For example, when the MPT is traversed from root node to a leaf node, a corresponding key-value pair is provided. The key is accumulated through the traversal, acquiring a single nibble (i.e., a single hexadecimal digit (a hex digit)) from each branch node, described below. In instances where multiple keys share the same prefix, or in the case of a single key having a unique suffix, optimizing nodes are provided. Consequently, while traversing the MPT, multiple nibbles from each of the other two node types, extension nodes and leaf nodes can be acquired.

In the MPT, leaf nodes are each provided as a two-item structure. One item corresponds to the nibbles in the key not already accounted for by the accumulation of keys, and branches traversed from the root. Hex-prefix encoding is used and the second parameter to the function is required to be true. Examples of leaf nodes, and respective items are described in further detail herein. Extension nodes are each provided as a two-item structure. One item corresponds to a series of nibbles of size greater than one that are shared by at least two distinct keys past the accumulation of nibbles keys, and branches as traversed from the root. Hex-prefix encoding is used, and the second parameter to the function is required to be false. Examples of extension nodes, and respective items are described in further detail herein. Branch nodes are provided as a 17-item structure, the first sixteen items correspond to each of the sixteen possible nibble values for the keys at this point in their traversal (e.g., hex values 0-f). The 17th item is used in the case of this being a terminator node, and thus a key being ended at this point in its traversal. A branch is only used when necessary, and no branch nodes may exist that contain only a single non-zero entry.

In blockchain networks, MPTs enable cryptographic authentication and performance balancing, and are used for world-state data organization to organize the account statuses of users (and smart contracts). In some blockchain networks, an interface is provided for querying the state of an account through a so-called world-state MPT. For example, an account address can be entered through the interface, and a node (e.g., full client) of the blockchain network returns the status of the account. When querying the state of a large number of accounts, the interface is repeatedly called, and the status of each account is returned. It can be noted that the returned data (e.g., account, status) is fragmented and does not have a structure. Although this data can be assembled locally into a status tree, the resulting status tree and the world-state MPT are generally inconsistent. Consequently, advantages of the MPT itself are lost, and there is relatively low performance of operations and storage.

As described in further detail herein, implementations of this specification execute a depth-first pre-order traversal to improve the order of search addresses in the MPT tree, and utilize a special type of node in the traversal process, referred to herein as a transition node, between two account nodes (leaf nodes). In further detail, implementations of this specification provide a world-state sub-tree, referred to herein as sub-tree T2 based on a world-state MPT T0, and an address list L0. Implementations of this specification avoid finding the path from the root node to a leaf node for each address by first constructing a sub-tree from the address list L0, referred to herein as sub-tree T1, then executing the depth-first pre-order traversal in the sub-tree T1. The account node address, and a transition node address are found in turn through the depth-first pre-order traversal. If there is a transition node between two account nodes, the first account node is returned to the transition node, and the other account node is found from the transition node. In this manner, the search for the second account node need not begin at the root node, and instead begins at the transition node.

As also described in further detail herein, implementations of this specification reduce processor, and storage requirements. For example, for each address, the path from the root node to its corresponding leaf node is saved, and the overlapping nodes in these paths are merged. More particularly, instead of storing complete paths from the root node to each account node (i.e., each leaf node corresponding to an account address), only the path from the transition node to the next account node is saved, if there is a transition node between the two account nodes. In this manner, paths to the multiple account nodes are merged, which improves efficiency and avoids the operational and storage waste caused by overlapping paths.

In some implementations, and as described in further detail herein, given a list of account addresses in the world-state MPT, a sub-tree of the address list is provided. Implementations of this specification adopt a depth-first, pre-order traversal algorithm to improve the order of search addresses in the MPT, and the efficiency of nodes. Further, implementations of this specification provide a node traversal process that includes a transition node between two account nodes. To avoid search waste caused by looking up each account node from the root node, implementations include saving the path from the transition node to the next account node, accounting for the overlap of the root node to the path of the two account nodes. As described herein, implementations of this specification, improve efficiency and avoid waste of operations and storage caused by overlapping paths.

Implementations of this specification are described in further detail with reference to an example world-state MPT. The example world-state MPT is based on the Ethereum Blockchain Application Platform provided by The Ethereum Foundation of Zug, Switzerland. Ethereum provides a digital asset referred to as Ether (ETH), the smallest unit of which is referred to as Wei (WEI). It is contemplated, however, that implementations of this specification can be realized in any appropriate blockchain network, and any appropriate world-state MPT.

Figure 3:
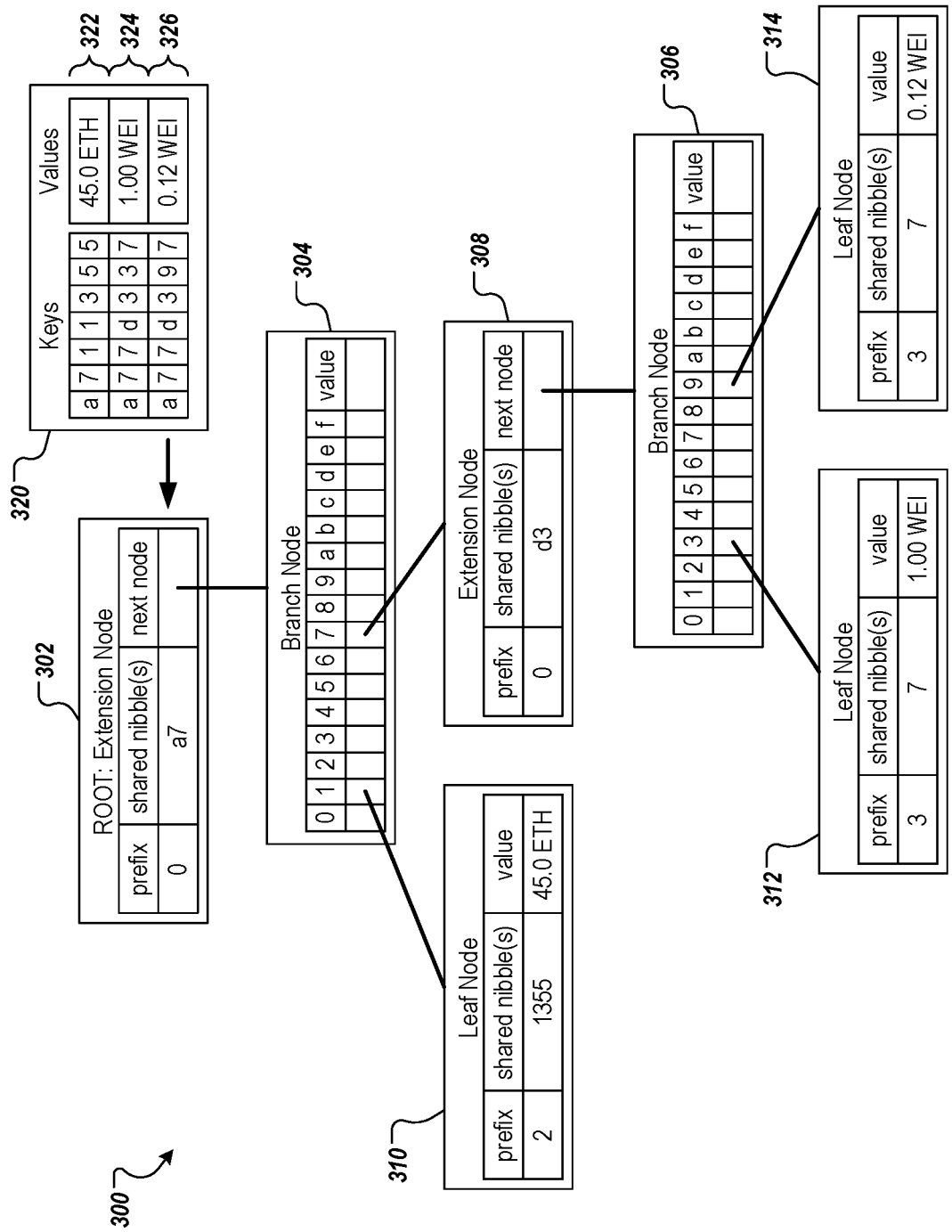
FIG. 3 depicts an example of a world-state Merkle Patricia Trie (MPT).

FIG. 3 depicts an example of a world-state MPT 300. It is appreciated that the example world-state MPT 300 of FIG. 3 is relatively simplistic to facilitate ease of understanding of implementations of this specification. However, it is contemplated that implementations of this specification can be realized with MPTs of varying degrees of complexity (e.g., hundreds, thousands of nodes). In the example of FIG. 3, the MPT 300 includes a root node 302, branch nodes 304, 306, an extension node 308, and leaf nodes 310, 312, 314. In some examples, the leaf nodes 310, 312, 314 correspond to respective accounts (Acct_1, Acct_2, Acct_3) within the blockchain network. The example world-state MPT 300 also includes a table 320 that records key-value pairs. In the example of FIG. 3, the table 320 include key-value pairs 322, 324, 326, which correspond to the leaf nodes 310, 312, 314, respectively.

In some examples, the world-state MPT 300 of FIG. 3 is maintained (e.g., constructed, updated) by multiple clients within the blockchain network. For example, full clients, described above, can participate in the consensus process, and maintain the world-state of the blockchain within the blockchain network. This can include, for example, storing a full copy of the blockchain, and the world-state MPT 300. Example full clients include the participant systems 202, 204 of FIG. 2, as described above.

As described above, the blockchain network can include light clients, which do not maintain the world-state of the blockchain, and do not store full copies of either the blockchain, and the world-state MPT 300. By way of non-limiting example, a light client might be interested in, or only have access to a sub-set of accounts within the blockchain network (e.g., Acct_1, Acct_2), and is either not interested in, or is not authorized to access other accounts (e.g., Acct_3). In accordance with implementations of this specification, the light client can maintain a state of the sub-set of accounts that is consistent with the state provided in the world-state MPT 300. As described in further detail herein, a full client generates a sub-tree of the MPT 300, the sub-tree representing a portion of the world-state MPT 300 that is relevant to the sub-set of accounts. The sub-tree is provided to the light client, and is periodically updated to ensure that the state of the sub-tree is consistent with the state of the world-state MPT 300.

Figure 4:
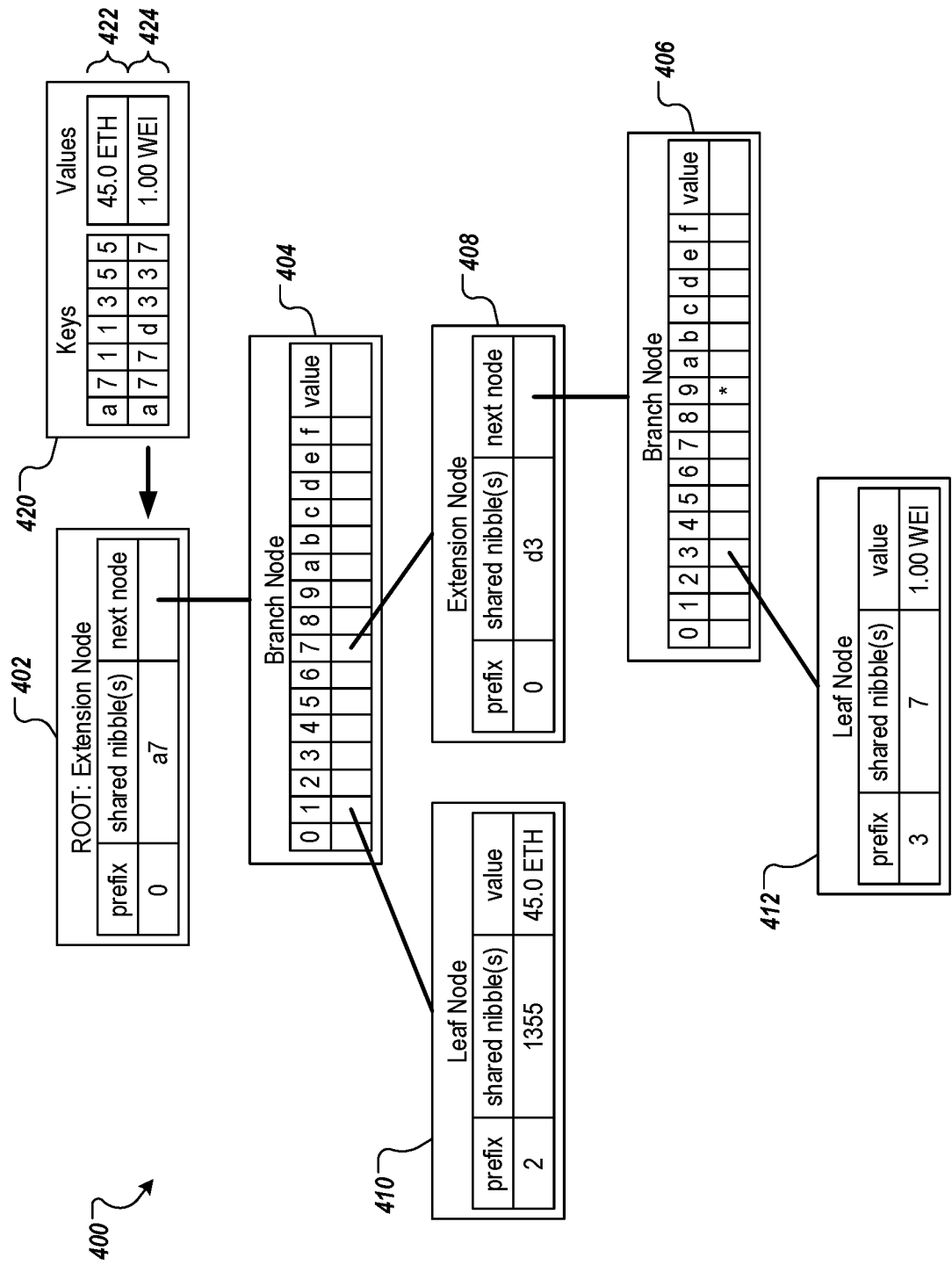
FIG. 4 depicts an example of a sub-tree generated based on the example world-state MPT of FIG. 3 in accordance with implementations of this specification.

FIG. 4 depicts an example of a sub-tree 400 generated based on the example world-state MPT 300 of FIG. 3 in accordance with implementations of this specification. In FIG. 4, the example sub-tree 400 includes a root node 402, branch nodes 404, 406, an extension node 408, and leaf nodes 410, 412, which correspond to the root node 302, the branch nodes 304, 306, the extension node 308, and leaf nodes 310, 312 of the world-state MPT 300 of FIG. 3. The leaf nodes 410, 412 correspond to the respective accounts (Acct_1, Acct_2) that the respective client (e.g., light client) has access to within the blockchain network. The example sub-tree 400 also includes a table 420 that records key-value pairs. In the example of FIG. 4, the table 420 include key-value pairs 422, 424, which correspond to the leaf nodes 410, 412, respectively.

The sub-tree 400 of FIG. 4 is absent a leaf node corresponding to the leaf node 314 of the world-state MPT tree 300 of FIG. 3 (e.g., the light client does not have access to the account (Acct_3) represented by the leaf node 314). Instead, the branch node 406 includes a placeholder character (*) in the 10$^{th}$ item.

In accordance with implementations of this specification, and as described in detail herein, the sub-tree 400 can be generated by a full client for a light client. For example, the light client can submit a request to the blockchain network for a sub-tree. In response to the request, a full client can generate the sub-tree 400 based on accounts that the light client has access to, and the world-state MPT 300 maintained by the full client. In some examples, the request from the light client includes an address list corresponding to a sub-set of accounts that the light client has access to. In some examples, the address list for the sub-set of accounts that the light client has access to is determined by the full client (e.g., indexing an access control list (ACL) using a unique identifier of the light client within the blockchain network). As described in further detail herein, given the world-state MPT 300, and the address list, the full client generates the sub-tree 400, and returns the sub-tree 400 to the requesting light client.

Figure 5A:
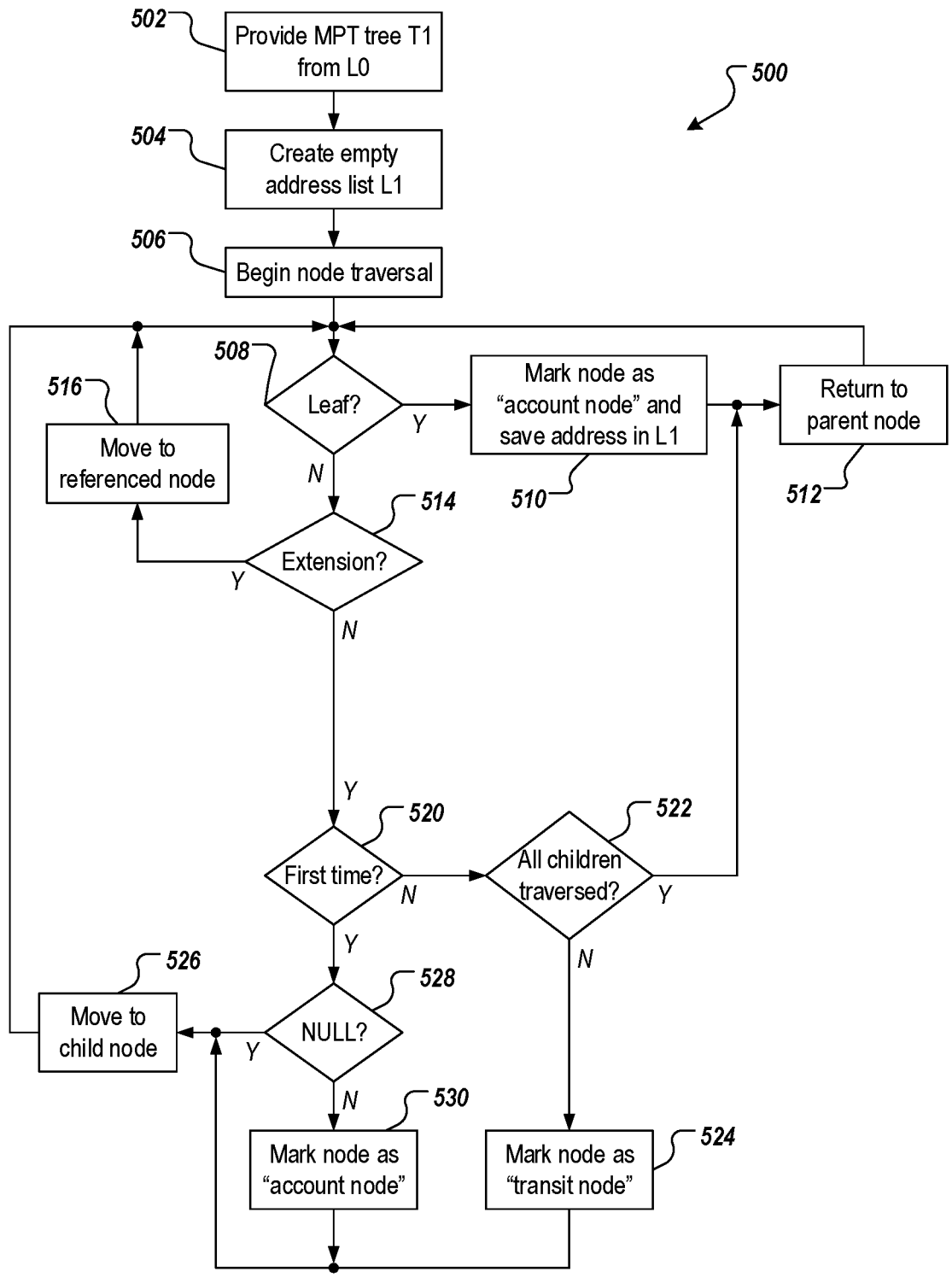
FIGS. 5A and 5B depict examples of processes that can be executed in accordance with implementations of this specification.
Figure 5B:
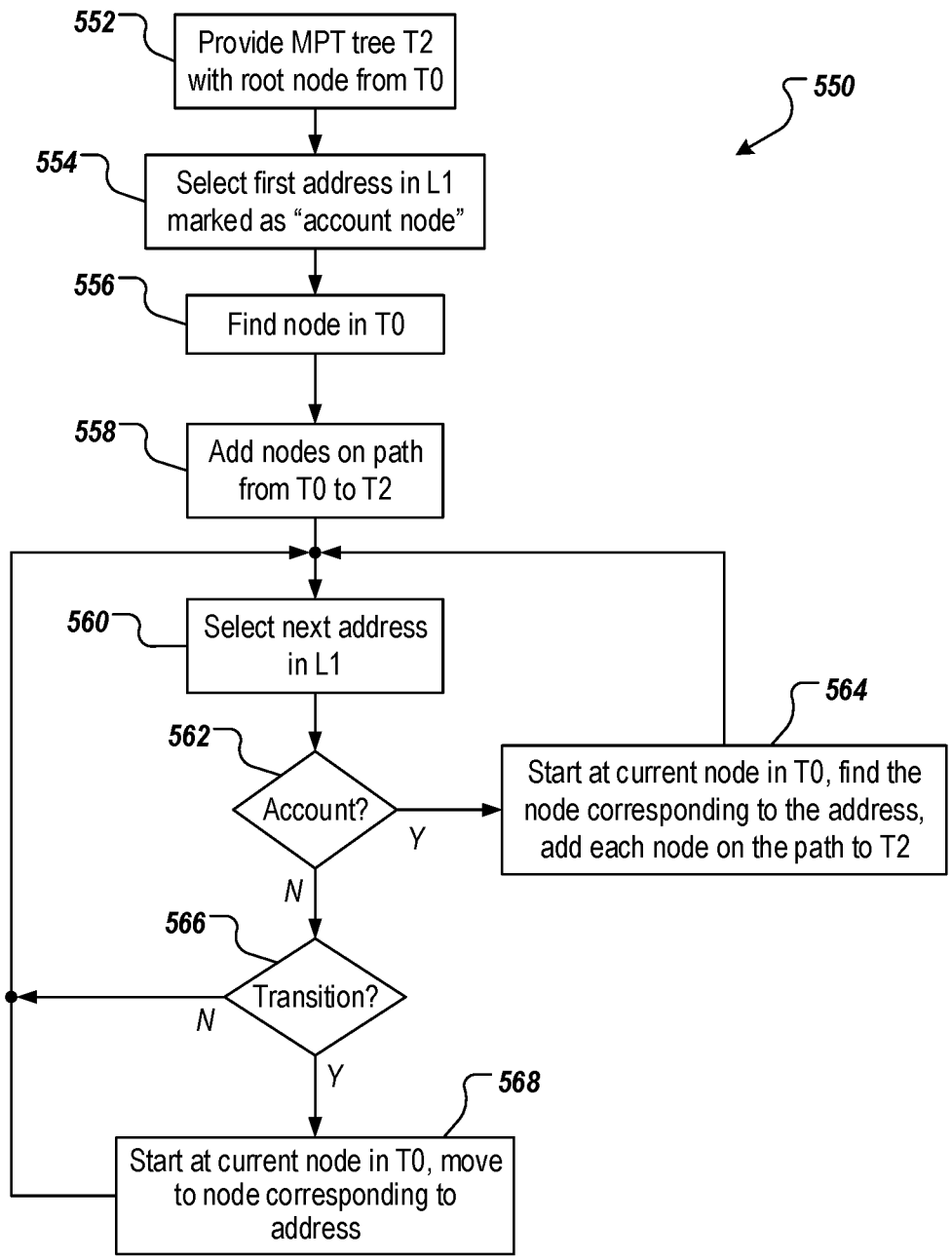

FIGS. 5A and 5B depict examples of processes 500, 550 that can be executed in accordance with implementations of this specification. In some implementations, the example processes 500, 550 may be performed using one or more computer-executable programs executed using one or more computing devices. For example, the example processes 500, 550 can be executed by a full client to generate a sub-tree for a light client within a blockchain network.

With particular reference to FIG. 5A, the example process 500 can be executed to provide an address list L1 from the world-state MPT T0 for construction of a sub-tree T2.

A world-state MPT T0 and an address list L0 are provided (502). For example, the world-state MPT T0 (e.g., the world-state MPT 300 of FIG. 3) and the address list L0 are provided as input for generating a sub-tree of the address list by the full client (e.g., the full client stores the world-state MPT 300, and receives the address list). In some examples, each address in the address list L0 is the address of a leaf node of the MPT tree T0 (e.g., the leaf nodes 310, 312, 314 of the MPT 300). Any order of the account addresses can be provided within the address list L0. In some implementations, and as described in further detail herein, a depth-first, pre-order traversal algorithm is used to the search over the nodes of the MPT tree T0.

An MPT tree T1 is provided from an address list L0 (502). In some examples, the address list L0 is based on an ACL that represents a list of addresses that the particular light client is allowed access to. In some examples, the address list L0 provides the addresses that are to be included in the sub-tree T2 that is to be created. In some examples, the value of each address in the address list L0 is regarded as an empty string (e.g., referred to as null) by default, and the value of each node in T1 can be calculated. An empty address list L1 is created (504). Node traversal is performed starting from the root node of T1, and traversing T1 with depth-first pre-order traversal (506). As described in further detail herein, the example process 500 recursively records the nodes of the addresses in the corresponding address list L0, and transition nodes between them in the address list L1.

It is determined whether a current node is a leaf node (508). If the current node is a leaf node, the node corresponds to a node in the address list. The node is marked (e.g., as an "account node"), and the address and the mark of the node are saved to the address L1 (510). The traversal returns to the parent node of the leaf node (512). If the current node is not a leaf node, it is determined whether the current node is an extension node (514). If the current node is an extension node, the value of the node points to a reference to another node, and the traversal moves to the referenced node (516).

If the current node is not an extension node, the current node is a branch node, and it is determined whether it is the first time to the node (520). If it is not the first time, it is determined whether all children of the current node have been traversed (522). If all children have been traversed, the traversal returns to the parent node of the branch node (512). If not all children have been traversed, the node is marked as "transition node," and the address of the node and the mark are saved in L1 (524), and the traversal moves to the child node that has not been traversed (526). If it is the first time to the current node (branch node), it is determined whether its value is empty (e.g., an empty string, also referred to as null) (528). If its value is empty, which indicates that the node corresponds to a node in the address list, the node is marked as "account node," and the mark and the address and mark are saved into L1 (530), and the traversal moves to the first child node (526).

With particular reference to FIG. 5B, the example process 550 can be executed to construct the sub-tree T2 from the address list L1, and the world-state MPT T0. As described herein, the sub-tree T2 includes the same root node as the world-state MPT T0, and the remainder of the sub-tree T2 is constructed from the root node by recursively performing the following.

The sub-tree T2 is provided with the root node of T0 (552). The first address in the address list L1 that is marked with "account node" is selected (554). The corresponding node is found in T0 (556). Accordingly, a search path is provided from the root node to the corresponding node in T0. Each node on the path is added to T2 (558). The next address in the address list L1 is selected (560). It is determined whether the node corresponding to the address is marked as "account node" (562). If the node is marked as "Account Node," starting at the current node in T0, the node corresponding to the address is found in T0, each node on the path is added to T2 (564).

If the node is not marked as "Account Node," it is determined whether the node is marked as "transition node" (566). If the node is marked as "transition node," starting at the current node in T0, the node corresponding to the address is determined, and provided as the (new) current node in T0 (568). The path of the account node to the transition node is not added to T2. After traversing all of the addresses in the address list L1, the resulting T2 is the sub-tree of the address list L0 in the original world-state MPT T0.

As introduced above, implementations of this specification are also directed to updating sub-trees based on world-state MPTs. More particularly, because the world-state records the account status of all nodes (e.g., users, smart contracts), the amount of data recorded in the world-state MPT can be relatively large. For clients, such as light clients, a large amount of data is either irrelevant, or inaccessible (e.g., no access privilege). Consequently, and as introduced above, some clients may only be willing to locally maintain the account status of some of the users (and smart contracts) associated with them in the world state. This is achieved by providing the client (light client) with a sub-tree of the world-state MPT tree that the client stores locally, as described herein.

However, the world-state maintained by the consensus nodes (e.g., in the world-state MPT) is frequently updated. Consequently, the sub-tree maintained by the client also needs to be periodically updated. In general, updating of the sub-tree can include synchronizing the most-recent data of the sub-tree with the data of the world-state MPT of the consensus node. In view of this, implementations of this specification provide for determining an updated state of a sub-tree from an updated world-state MPT tree for updating the sub-tree in a bandwidth-, processor-, and memory-efficient manner.

Figure 6:
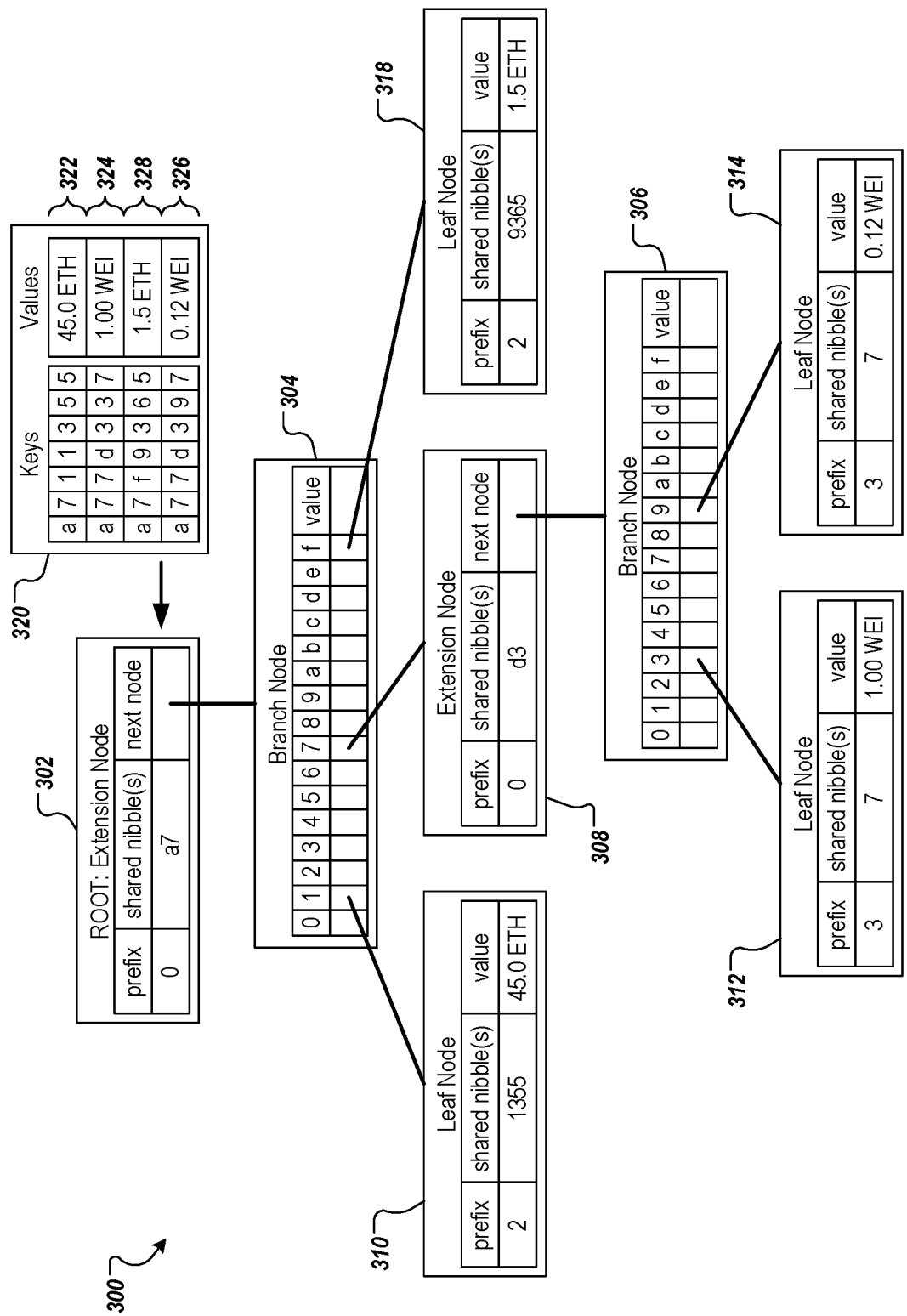
FIG. 6 depicts the example world-state MPT of FIG. 3 including updates.

FIG. 6 depicts the example world-state MPT 300 of FIG. 3 including updates. In the example of FIG. 6, the MPT 300 includes the root node 302, the branch nodes 304, 306, the extension node 308, the leaf nodes 310, 312, 314, and a leaf node 318. In some examples, and as described above, the leaf nodes 310, 312, 314 correspond to respective accounts (Acct_1, Acct_2, Acct_3) within the blockchain network. The leaf node 318 corresponds to a respective account (Acct_4), which was added to the blockchain network (e.g., after the world-state MPT 300 of FIG. 3 was provided). The example table 320 records the key-value pairs 322, 324, 326, which correspond to the leaf nodes 310, 312, 314, respectively, and a key-value pair 328 that corresponds to the leaf node 318. Accordingly, the updates to the world-state MPT 300 includes the leaf node 318, and the respective key-value pair 328.

In accordance with implementations of this specification, and as described in detail herein, the sub-tree 400 of FIG. 4 can be updated based on a set of updates provided by a full client for the light client. For example, the light client can submit a request to the blockchain network for an updated sub-tree. In response to the request, a full client can determine updates to the sub-tree 400 based on a current state of the world-state MPT 300 (e.g., as depicted in FIG. 6) maintained by the full client. In some examples, the full client generates a set of updates (e.g., as opposed to a new sub-tree), and transmits the set of updates to the light client. The light client processes the set of updates to update the sub-tree 400.

Figure 7:
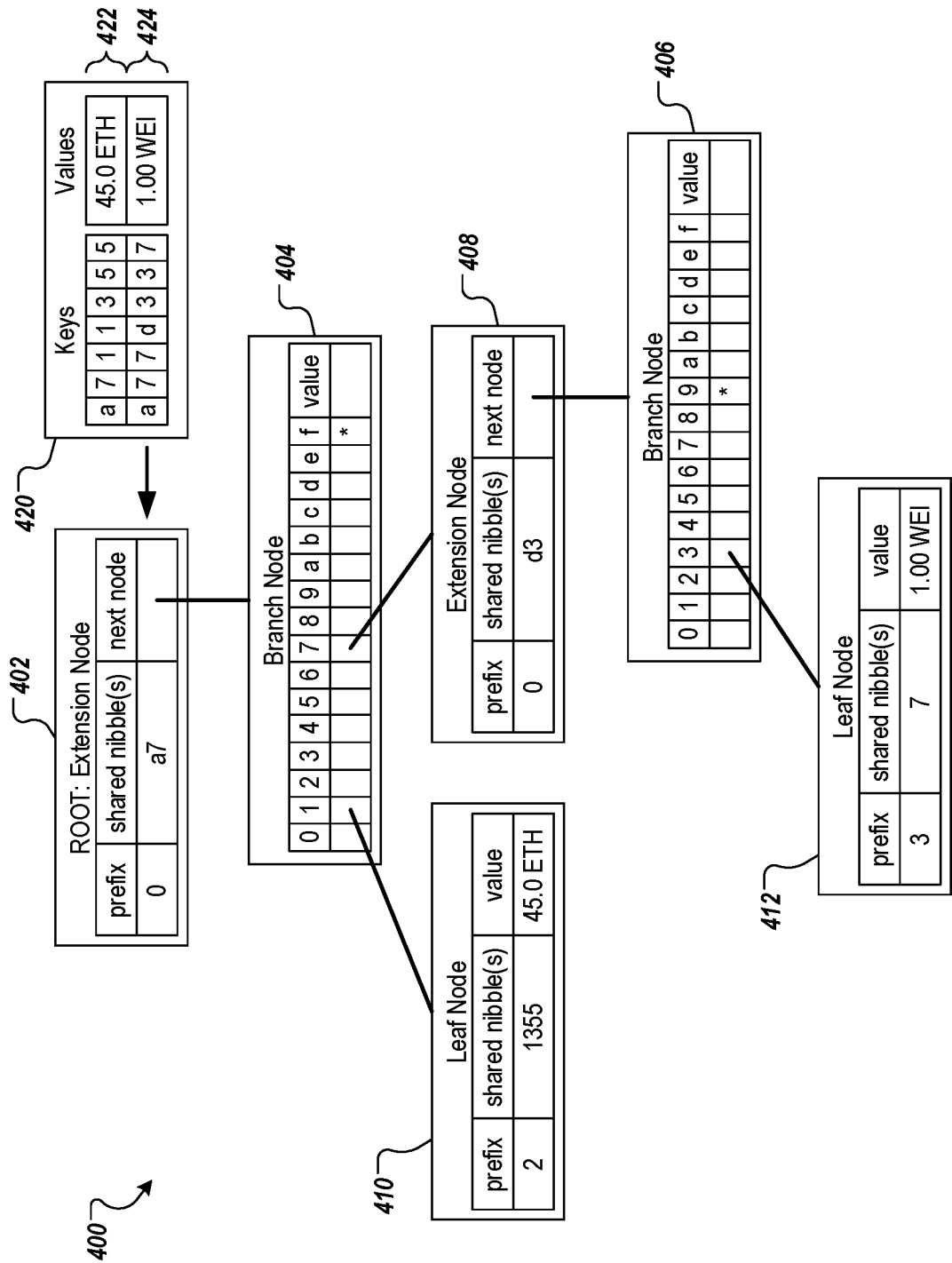
FIG. 7 depicts the example sub-tree of FIG. 4 including updates based on the example world-state MPT of FIG. 6 in accordance with implementations of this specification.

FIG. 7 depicts the example sub-tree 400 of FIG. 4 including updates based on the example world-state MPT 300 of FIG. 6 in accordance with implementations of this specification. The example sub-tree 400 of FIG. 7 includes the root node 402, the branch nodes 404, 406, the extension node 408, and the leaf nodes 410, 412, which correspond to the root node 302, the branch nodes 304, 306, the extension node 308, and leaf nodes 310, 312 of the world-state MPT 300 of FIG. 3. The leaf nodes 410, 412 correspond to the respective accounts (Acct_1, Acct_2) that the respective client (e.g., light client) has access to within the blockchain network. The example sub-tree 400 also includes the table 420 that records key-value pairs. In the example of FIG. 7, the table 420 include key-value pairs 422, 424, 426, which correspond to the leaf nodes 410, 412, 414, respectively.

As in FIG. 4, the sub-tree 400 of FIG. 7 is absent a leaf node corresponding to the leaf node 312 of the world-state MPT tree 300 of FIGS. 3 and 6 (e.g., the light client does not have access to the account (Acct_3) represented by the leaf node 312). Instead, the branch node 406 includes a placeholder character (*) in the $10^{th}$ item. Further, the sub-tree 400 of FIG. 7 is absent a leaf node corresponding to the leaf node 318 of the world-state MPT tree 300 of FIG. 6 (e.g., the light client does not have access to the account (Acct_4) represented by the leaf node 318). Instead, the branch node 404 includes a placeholder character (*) in the $16^{th}$ item.

Figure 8A:
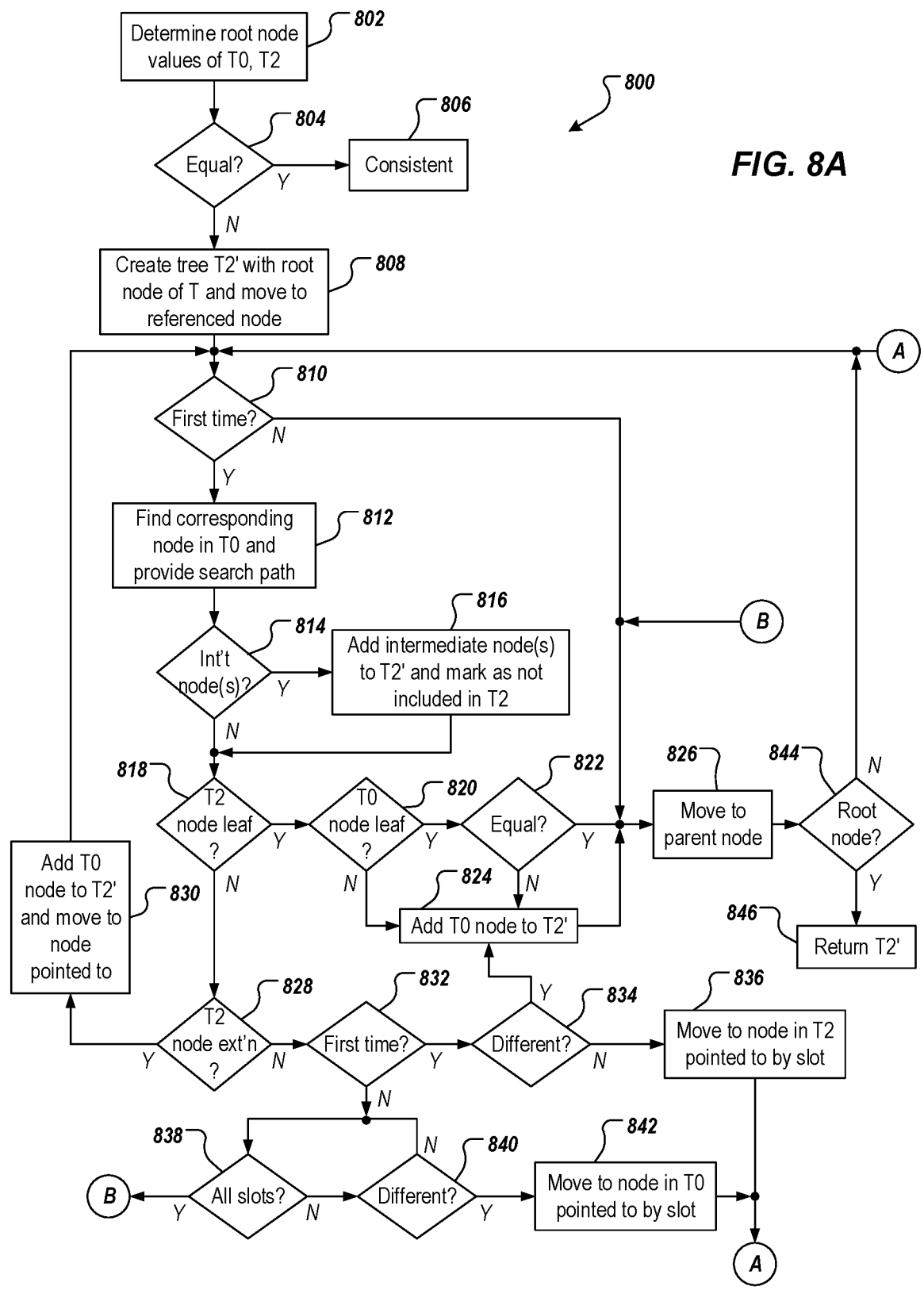
FIGS. 8A and 8B depict examples of processes that can be executed in accordance with implementations of this specification.
Figure 8B:
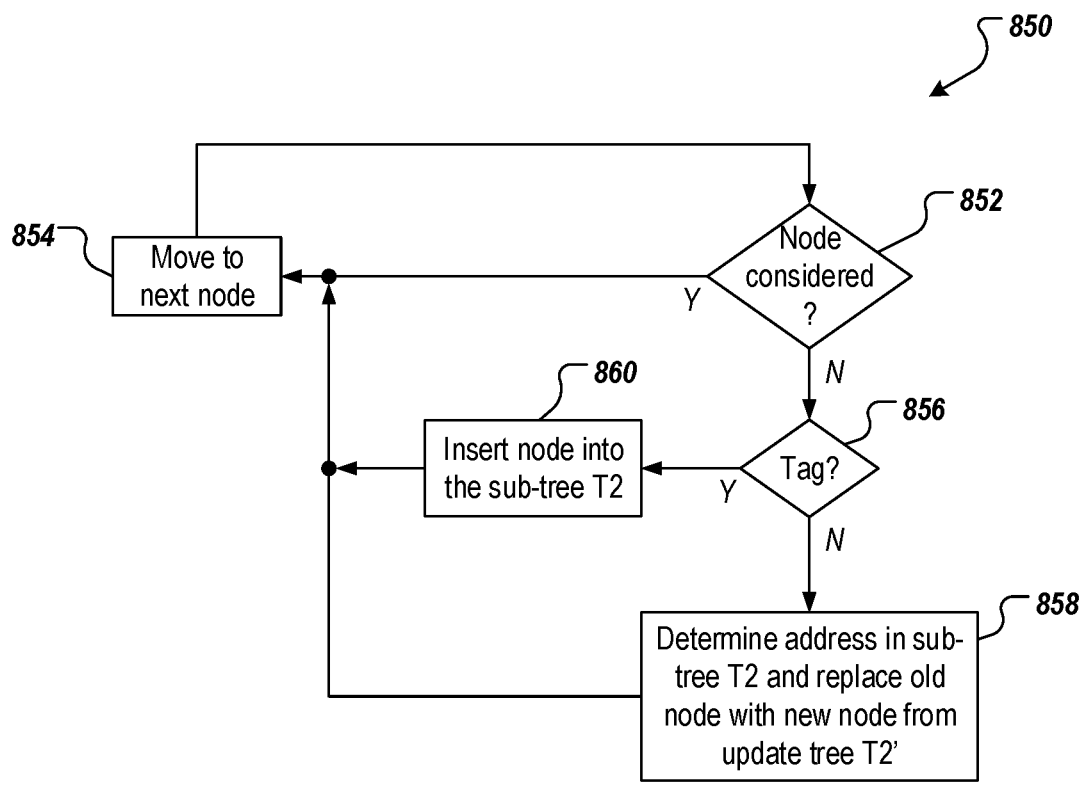

FIGS. 8A and 8B depict examples of processes 800, 850 that can be executed in accordance with implementations of this specification. In some implementations, the example processes 800, 850 may be performed using one or more computer-executable programs executed using one or more computing devices. For example, the example process 800 can be executed by a full client to generate a set of updates to a sub-tree for a light client within a blockchain network, and the example process 850 can be executed by a light client to update a locally maintained sub-tree.

With particular reference to FIG. 8A, the example process 800 can be executed to provide a set of updates (e.g., provided as a sub-tree T2' of updated nodes) from a world-state MPT T0, and a sub-tree T2. As described herein, the example process 800 does a pair-wise node comparison between a node (current node) of the sub-tree T2, and a corresponding node (current node) of the world-state MPT T0, and adds any nodes of the world-state MPT T0 that are different to the update tree T2'.

A value of the root node of T0 and a value of the root node of T2 are determined (802), and the values are compared (804). If the values are the same, the sub-tree T2 is in a consistent state with the MPT T0, and is indicated as such (806). For example, a response can be sent from the full client to the light client, which requested the update, to indicate that the sub-tree T2 is consistent with the world-state. If the values are different, the world-state MPT T0 has been updated since the sub-tree T2 was created. Consequently, the update tree T2' is created with the root node of the MPT T0, and the current node moves from the root node of the sub-tree T2 to the node whose value is referenced (808). That is, the value of a leaf node is a key to some data stored in the database (storing key-value pairs). Consequently, the value of the leaf node references the actual data in the database. For a non-leaf node, its value is the address of another node. That is, a non-leaf node points to (references) another node.

It is determined whether it is the first time to the current node in the sub-tree T2 (810). If it is the first time to the current node in the sub-tree T2, a node corresponding to the current node's address is found in the MPT T0, and a search path is provided (812). In some examples, the search path is the depth traversal within the MPT T0 to the corresponding node. It is determined whether there are any intermediate nodes in the search path (814). If there are one or more intermediate nodes in the search path, the intermediate node(s) are added to the tree T2', and are each tagged (marked) to indicate that they are nodes that the sub-tree T2 does not include. In some examples, a tag is provided as metadata that is used to mark the node, as described herein.

It is determined whether the current node in T2 is a leaf node (818). If the current node in T2 is a leaf node, it is determined whether the current node in T0 is a leaf node (820). If the current node in T0 is a leaf node, the values of the current nodes of T2 and T0 are compared (822). If the values are different, the current node in T0 is added to T2' (824). If the values are not different, the current node in T2 moves to the parent node (826). In this manner, the current node of T0 is only added to the update tree T2', if it is of a different type of node than the current node of T2, or is of a different value of the current node of T2. If they are of the same type, and value, the current node of T0 is not added to the update tree T2'. If the current node in T2 is not a leaf node, it is determined whether the current node in T2 is an extension node (828). If the current node in T2 is an extension node, the current node in T0 is added to T2', and the current node in T2 moves to the node pointed to by the slot, and the example process (800) loops back.

If the current node in T2 is not an extension node, the current node in T2, and the current node in T0 are each a branch node. It is determined whether it is the first time that the current node in T2 is being considered (832). If it is the first time, it is determined whether the values of the current node of T2, and the current node of T0 are different (834). If the values are different the current node of T0 is added to the update tree T2' (834). If the values are the same, the next slot in the current node in T2 that points to another node in T2 is determined, and the current node of T2 moves to the node that the slot points to. That is, any slots that do not point to another node in T2, even if its value is not NULL, are not considered, because such slots point to a node in T0 that is not in T2. Accordingly, the example process 800 provides for slot comparison, starting from the first slot, until encountering a slot that has a different value, and the current node in T2 moves to the node pointed to by this slot (836), and the example process 800 loops back.

If it is not the first time to the current node of T2 (832), it is determined whether all slots between the current node of T2 and the current node of T0 have been compared (838). If all slots have been compared, the example process 800 loops back to move to the parent node (826). If all slots have not been compared, the remaining slots that are not NULL are iteratively compared with those of the current node of T0, until encountering a value in the remaining slots that is different (840). The current node of T0 moves to the node pointed to by this slot (842), and the example process 800 loops back.

As the example process 800 recursively executes, and the current node of the sub-tree T2 iteratively moves to a parent node (826), it is determined whether the parent node is the root node (844). If the parent node is not the root node, the example process 800 loops back to consider the (new) current node of the sub-tree T2 relative to the MPT T0. If the parent node is the root node, the update tree T2' is returned (846). The update sub-tree is made up of all updated nodes of the sub-tree T2 in view of the updated world-state MPT T0. That is, the update tree T2' only includes those nodes of the sub-tree T2 that have been updated in view of the updated MPT T0.

With particular reference to FIG. 8B, the example process 850 can be executed to update the sub-tree T2 at the light client based on the update tree T2' provided from the full client. That is, the full client need only transmit the update tree T2' to the light client, as opposed to a wholly new created sub-tree. Because the update tree T2' only includes updated nodes, it is a smaller data structure than the sub-tree T2. Accordingly, by sending only an updated tree T2' computing resources, and bandwidth are conserved (e.g., relative to sending a wholly new sub-tree T2 to the light client). In some examples, the light client executes the example process 850 upon receiving the update tree T2' to locally update the sub-tree T2.

Beginning with the root node of the update tree T1, the example process 800 executes a depth-first order traversal to consider each node (as a current node). It is determined whether the current node has been considered (852). If the current node has been considered, the next node is selected as the current node (854), and the example process 850 loop back. If the current node has not been considered, it is determined whether the current node has a tag (is marked) (856). If the current node does not have a tag, the node whose address is in the original sub-tree T2 is determined, and the old node is replaced with the new node from the update tree T2' (858). If the current node has a tag (i.e., its address does not have a corresponding node in the original sub-tree T2), the node is inserted into the sub-tree T2 (860). After traversing all the nodes of the update tree T2', the sub-tree T2 is updated to reflect the relevant updates of the updated MPT T0.

Figure 9:
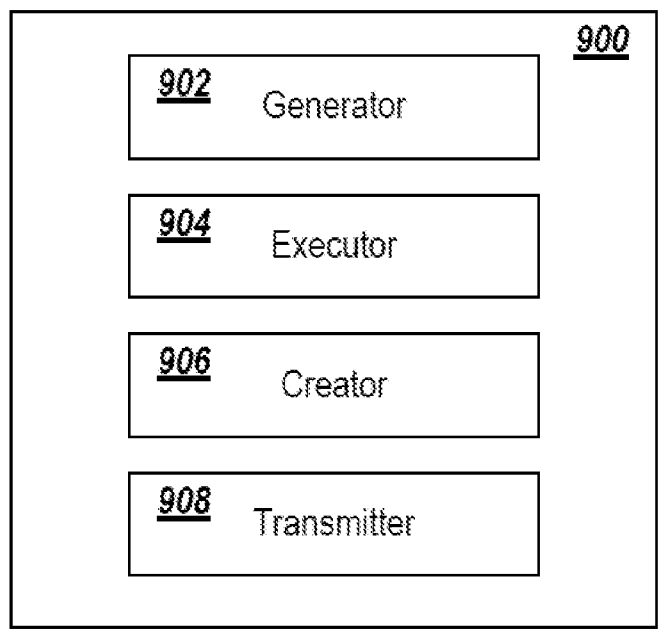
FIG. 9 depicts examples of modules of an apparatus in accordance with implementations of this specification.

FIG. 9 depicts examples of modules of an apparatus 900 in accordance with implementations of this specification. The apparatus 900 can be an example implementation of a blockchain node configured to generate a sub-tree of a world-state MPT in a blockchain network, such as a consortium blockchain network. The apparatus 900 can correspond to the implementations described above, and the apparatus 900 includes the following: a generator or generating unit 902 for providing a world-state MPT and an address list for storing addresses of nodes within the blockchain network, an executor or executing unit 904 for traversal of the world-state MPT, a creator or creating unit 906 for generating a sub-tree of the world-state MPT, and a transmitter or transmitting unit 908 for transmitting the sub-tree of the world-state MPT to a non-consensus client of the blockchain network.

Figure 10:
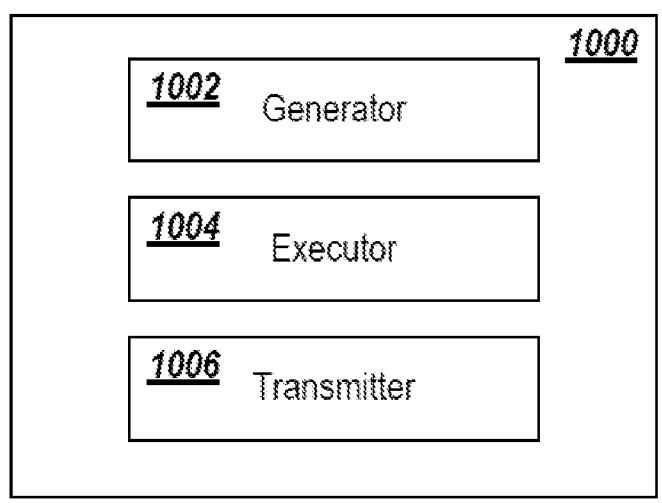
FIG. 10 depicts examples of modules of an apparatus in accordance with implementations of this specification.

FIG. 10 depicts examples of modules of an apparatus 1000 in accordance with implementations of this specification. The apparatus 1000 can be an example implementation of a blockchain node configured to update a sub-tree of a world-state MPT in a blockchain network, such as a consortium blockchain network. The apparatus 1000 can correspond to the implementations described above, and the apparatus 1000 includes the following: a generator or generating unit 1002 for creating an update tree including a root node of the world-state MPT, and initially being absent other nodes; an executor or executing unit 1004 for executing a traversal of at least a portion of the sub-tree in multiple iterations; and a transmitter or transmitting unit 1006 for transmitting the update tree of the sub-tree to a non-consensus node of the blockchain network, the non-consensus client updating a locally stored sub-tree using the update tree to provide an updated sub-tree that provides a state of accounts associated with the non-consensus client.

The system, apparatus, module, or unit illustrated in the previous implementations can be implemented by using a computer chip or an entity, or can be implemented by using a product having a certain function. A typical implementation device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

For an implementation process of functions and roles of each unit in the apparatus, references can be made to an implementation process of corresponding steps in the previous method. Details are omitted here for simplicity.

Because an apparatus implementation basically corresponds to a method implementation, for related parts, references can be made to related descriptions in the method implementation. The previously described apparatus implementation is merely an example. The units described as separate parts may or may not be physically separate, and parts displayed as units may or may not be physical units, may be located in one position, or may be distributed on a number of network units. Some or all of the modules can be selected based on actual demands to achieve the objectives of the solutions of the specification. A person of ordinary skill in the art can understand and implement the implementations of the present application without creative efforts.

Referring again to FIG. 9, it can be interpreted as illustrating an internal functional module and a structure of a sub-tree of a world-state MPT generating apparatus. The sub-tree of a world-state MPT generating apparatus can be an example of a blockchain node configured to generate a sub-tree of a world-state MPT within a blockchain network. Referring again to FIG. 10, it can be interpreted as illustrating an internal functional module and a structure of a sub-tree of a world-state MPT updating apparatus. The sub-tree of a world-state MPT updating apparatus can be an example of a blockchain node configured to update a subtree of a world-state MPT within a blockchain network. An execution body in essence can be an electronic device, and the electronic device includes the following: one or more processors; and a memory storing an executable instruction of the one or more processors.

Described implementations of the subject matter can include one or more features, alone or in combination. For example, in a first implementation, actions can be executed for providing a world-state MPT, and an address list for storing addresses of nodes within the blockchain network, the address list being initially empty; executing a traversal of at least a portion of the world-state MPT in multiple iterations, and, at each iteration, for a current node of the at least a portion of the world-state MPT, executing one of: marking the current node as an account node, and storing an address of the current node in the address list, determining that the current node is an extension node, and moving to a next iteration of the traversal setting the current node to a node referenced by the extension node, and marking the current node as a transition node, and storing an address of the current node in the address list; creating a sub-tree of the world-state MPT based on the address list, a root node of the sub-tree including a root node of the world-state MPT, and one or more child nodes of the sub-tree corresponding to nodes of the world-state MPT having an address stored in the address list; and transmitting the sub-tree of the world-state MPT to a non-consensus client of the blockchain network, the sub-tree providing a state of accounts associated with the non-consensus client.

The foregoing and other described implementations can each, optionally, include one or more of the following features:

In a first feature, combinable with any of the following features, the current node is marked as an account node in response to determining that the current node is one of a leaf node, and a branch node that is absent a null value.

In a second feature, combinable with any of the following features, the current node is marked as a transition node in response to determining that the current node is a branch node, and that all children nodes of the branch node have been traversed.

In a third feature, combinable with any of the following features, after marking the current node as an account node, the current node of a next iteration of the traversal includes a parent node of the account node.

In a fourth feature, combinable with any of the following features, after marking the current node as one of an account node and a transition node, the current node of a next iteration of the traversal includes a child node of the one of the account node and the transition node.

In a fifth feature, combinable with any of the following features, creating a sub-tree of the world-state MPT based on the address list at least partially includes, for an address marked as an account node in the address list, determining a path within the world-state MPT, and adding the path to the sub-tree.

In a sixth feature, combinable with any of the following features, the traversal includes a depth-first pre-order traversal.

Implementations of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, e.g., one or more modules of computer program instructions, encoded on a computer program carrier, for execution by, or to control the operation of, data processing apparatus. The carrier may be a tangible non-transitory computer storage medium. Alternatively, or in addition, the carrier may be an artificially-generated propagated signal, e.g., a machine-generated electrical, optical, or electromagnetic signal, that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

The term "data processing apparatus" encompasses all kinds of apparatus, devices, and machines for processing data, including by way of example a programmable processor, a computer, or multiple processors or computers. Data processing apparatus can include special-purpose logic circuitry, e.g., an FPGA (field programmable gate array), an ASIC (application-specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub-programs, or portions of code.

The processes and logic flows described in this specification can be performed by one or more computers executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read-only memory or a random access memory or both. Elements of a computer can include a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more mass storage devices. The mass storage devices can be, for example, magnetic, magneto-optical, or optical disks, or solid state drives. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, implementations of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

While this specification contains many specific implementation details, these should not be construed as limitations on the scope of what is being claimed, which is defined by the claims themselves, but rather as descriptions of features that may be specific to particular implementations. Certain features that are described in this specification in the context of separate implementations can also be realized in combination in a single implementation. Conversely, various features that are described in the context of a single implementation can also be realized in multiple implementations separately or in any suitable sub-combination. Moreover, although features may be described above as acting in certain combinations and even initially be claimed as such, one or more features from a claimed combination can in some cases be excised from the combination, and the claim may be directed to a sub-combination or variation of a sub-combination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for providing a sub-tree of a world-state Merkle Patricia Trie (MPT) within a blockchain network, the method comprising:
   providing, by a consensus client of the blockchain network, a world-state MPT, and an address list for storing addresses of nodes within the blockchain network, the address list being initially empty;
   executing, by the consensus client, a traversal of at least a portion of the world-state MPT in multiple iterations, and, at each iteration, for a current node of the at least a portion of the world-state MPT, executing one of:
      marking the current node as an account node, and storing an address of the current node in the address list,
      determining that the current node is an extension node, and moving to a next iteration of the traversal setting the current node to a node referenced by the extension node, and
      marking the current node as a transition node, and storing an address of the current node in the address list;
   creating, by the consensus client, a sub-tree of the world-state MPT based on the address list, a root node of the sub-tree comprising a root node of the world-state MPT, and one or more child nodes of the sub-tree corresponding to nodes of the world-state MPT having an address stored in the address list; and
   transmitting, by the consensus client, the sub-tree of the world-state MPT to a non-consensus client of the blockchain network, the sub-tree providing a state of accounts associated with the non-consensus client.

2. The method of claim 1, wherein the current node is marked as an account node in response to determining that the current node is one of a leaf node, and a branch node that is absent a null value.

3. The method of claim 1, wherein the current node is marked as a transition node in response to determining that the current node is a branch node, and that all children nodes of the branch node have been traversed.

4. The method of claim 1, wherein, after marking the current node as an account node, the current node of a next iteration of the traversal comprises a parent node of the account node.

5. The method of claim 1, wherein, after marking the current node as one of an account node and a transition node, the current node of a next iteration of the traversal comprises a child node of the one of the account node and the transition node.

6. The method of claim 1, wherein creating a sub-tree of the world-state MPT based on the address list at least partially comprises, for an address marked as an account node in the address list, determining a path within the world-state MPT, and adding the path to the sub-tree.

7. The method of claim 1, wherein the traversal comprises a depth-first pre-order traversal.

8. A non-transitory, computer-readable storage medium storing one or more instructions executable by a computer system to perform operations comprising:
   provide, by a consensus client of a blockchain network, a world-state Merkle Patricia Trie (MPT) within the blockchain network, and an address list for storing addresses of nodes within the blockchain network, the address list being initially empty;
   execute, by the consensus client, a traversal of at least a portion of the world-state MPT in multiple iterations, and, at each iteration, for a current node of the at least a portion of the world-state MPT, executing one of:
      mark the current node as an account node, and storing an address of the current node in the address list,
      determine that the current node is an extension node, and moving to a next iteration of the traversal setting the current node to a node referenced by the extension node, and
      mark the current node as a transition node, and storing an address of the current node in the address list;
   create, by the consensus client, a sub-tree of the world-state MPT based on the address list, a root node of the sub-tree comprising a root node of the world-state MPT, and one or more child nodes of the sub-tree corresponding to nodes of the world-state MPT having an address stored in the address list; and
   transmit, by the consensus client, the sub-tree of the world-state MPT to a non-consensus client of the blockchain network, the sub-tree providing a state of accounts associated with the non-consensus client.

9. The non-transitory computer-readable storage medium of claim 8, wherein the current node is marked as an account node in response to determining that the current node is one of a leaf node, and a branch node that is absent a null value.

10. The non-transitory computer-readable storage medium of claim 8, wherein the current node is marked as a transition node in response to determining that the current node is a branch node, and that all children nodes of the branch node have been traversed.

11. The non-transitory computer-readable storage medium of claim 8, wherein, after marking the current node as an account node, the current node of a next iteration of the traversal comprises a parent node of the account node.

12. The non-transitory computer-readable storage medium of claim 8, wherein, after marking the current node as one of an account node and a transition node, the current node of a next iteration of the traversal comprises a child node of the one of the account node and the transition node.

13. The non-transitory computer-readable storage medium of claim 8, wherein creating a sub-tree of the world-state MPT based on the address list at least partially comprises, for an address marked as an account node in the address list, determining a path within the world-state MPT, and adding the path to the sub-tree.

14. The non-transitory computer-readable storage medium of claim 8, wherein the traversal comprises a depth-first pre-order traversal.

15. A system, comprising:
   one or more computers; and
   one or more computer memory devices interoperably coupled with the one or more computers and having tangible, non-transitory, machine-readable media storing one or more instructions that, when executed by the one or more computers, perform one or more operations comprising:

providing, by a consensus client of a blockchain network, a world-state Merkle Patricia Trie (MPT) within the blockchain network, and an address list for storing addresses of nodes within the blockchain network, the address list being initially empty;

execute, by the consensus client, a traversal of at least a portion of the world-state MPT in multiple iterations, and, at each iteration, for a current node of the at least a portion of the world-state MPT, executing one of:

mark the current node as an account node, and storing an address of the current node in the address list, determine that the current node is an extension node, and moving to a next iteration of the traversal setting the current node to a node referenced by the extension node, and mark the current node as a transition node, and storing an address of the current node in the address list;

create, by the consensus client, a sub-tree of the world-state MPT based on the address list, a root node of the sub-tree comprising a root node of the world-state MPT, and one or more child nodes of the sub-tree corresponding to nodes of the world-state MPT having an address stored in the address list; and transmit, by the consensus client, the sub-tree of the world-state MPT to a non-consensus client of the blockchain network, the sub-tree providing a state of accounts associated with the non-consensus client.

16. The system of claim 15, wherein the current node is marked as an account node in response to determining that the current node is one of a leaf node, and a branch node that is absent a null value.

17. The system of claim 15, wherein the current node is marked as a transition node in response to determining that the current node is a branch node, and that all children nodes of the branch node have been traversed.

18. The system of claim 15, wherein, after marking the current node as an account node, the current node of a next iteration of the traversal comprises a parent node of the account node.

19. The system of claim 15, wherein, after marking the current node as one of an account node and a transition node, the current node of a next iteration of the traversal comprises a child node of the one of the account node and the transition node.

20. The system of claim 15, wherein creating a sub-tree of the world-state MPT based on the address list at least partially comprises, for an address marked as an account node in the address list, determining a path within the world-state MPT, and adding the path to the sub-tree.

21. The system of claim 15, wherein the traversal comprises a depth-first pre-order traversal.

* * * * *